United States Patent
Stallmann et al.

(10) Patent No.: US 8,871,165 B2
(45) Date of Patent: Oct. 28, 2014

(54) DESULFURIZATION IN A REGENERATIVE CALCIUM CYCLE SYSTEM

(71) Applicant: ALSTOM Technology Ltd, Baden (CH)

(72) Inventors: Olaf Stallmann, Essenheim (DE); Gerhard Heinz, Esslingen (DE); Peter Ulrich Koss, Baden (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/055,170

(22) Filed: Oct. 16, 2013

(65) Prior Publication Data

US 2014/0102343 A1     Apr. 17, 2014

(30) Foreign Application Priority Data

Oct. 16, 2012   (EP) .................................... 12188666

(51) Int. Cl.
  *B01D 53/50*    (2006.01)
  *B01D 53/62*    (2006.01)
  *B01D 53/74*    (2006.01)
  *B01D 53/75*    (2006.01)
  *F23J 15/02*    (2006.01)
  *B01D 53/83*    (2006.01)
  *B01D 53/34*    (2006.01)

(52) U.S. Cl.
  CPC ............... *F23J 15/022* (2013.01); *B01D 53/83* (2013.01); *B01D 2251/404* (2013.01); *Y02C 10/06* (2013.01); *B01D 53/75* (2013.01); *B01D 2251/602* (2013.01); *B01D 53/343* (2013.01); *B01D 53/508* (2013.01); *Y02C 10/04* (2013.01); *B01D 2258/0283* (2013.01); *F23J 15/02* (2013.01); *B01D 53/62* (2013.01); *B01D 2251/606* (2013.01)

USPC ...... 423/210; 423/230; 423/244.07; 422/168; 422/170; 422/172; 422/177; 422/178

(58) Field of Classification Search
USPC ............. 423/210, 230, 244.07; 422/168, 170, 422/172, 177, 178
See application file for complete search history.

(56) References Cited

U.S. PATENT DOCUMENTS 3,807,090 A * 4/1974 Moss .............................. 48/128
3,966,431 A * 6/1976 Craig et al. ................. 48/197 R
(Continued)

FOREIGN PATENT DOCUMENTS

| EP | 2 145 670 | 1/2010 |
|----|-----------|--------|
| EP | 2 299 176 | 3/2011 |

(Continued)

*Primary Examiner* — Timothy Vanoy

(57) ABSTRACT

A method for combustion of a fuel and treatment of the resulting flue gas includes: combusting a fuel to produce a hot flue gas stream containing at least carbon dioxide ($CO_2$) and sulfur dioxide ($SO_2$), bringing the flue gas stream into contact with solid calcium oxide (CaO) in a carbonation reactor operating at a temperature at which $CO_2$ in the flue gas reacts with CaO to form solid calcium carbonate ($CaCO_3$), heating $CaCO_3$ in a calcination reactor operating at a temperature at which $CaCO_3$ is converted to CaO and $CO_2$, and recirculating CaO formed in the calcination reactor back to the carbonation reactor. Heating can be at least partially effected by indirect heat exchange with hot flue gas from the combustion. Flue gas used for the indirect heat exchange can be subsequently subjected to dry desulfurization before it is brought into contact with CaO in the carbonation reactor.

20 Claims, 2 Drawing Sheets

(56) References Cited

U.S. PATENT DOCUMENTS

| | | | |
|---|---|---|---|
| 4,197,285 A * | 4/1980 | Yang et al. | 423/638 |
| 6,737,031 B2 | 5/2004 | Beal et al. | |
| 8,435,470 B2 * | 5/2013 | Epple | 423/220 |

FOREIGN PATENT DOCUMENTS

| | | |
|---|---|---|
| WO | 2007/045048 | 4/2007 |
| WO | 2009/137886 | 11/2009 |
| WO | 2010/059882 | 5/2010 |

* cited by examiner

DESULFURIZATION IN A REGENERATIVE CALCIUM CYCLE SYSTEM

CROSS-REFERENCE TO RELATED APPLICATIONS

This application claims priority to European application 12188666.7 filed Oct. 16, 2012, the contents of which are hereby incorporated in its entirety.

TECHNICAL FIELD

The present invention relates to systems and methods for capturing carbon dioxide from flue gas using regenerative calcium cycle systems.

BACKGROUND

In the combustion of fuel, for example coal, oil, peat, waste, natural gas, etc in a combustion plant, such as power plant, a process gas comprising among other components, carbon dioxide in large amounts. The negative effects of carbon dioxide on climate change are well known and there is a strong demand on reducing the emissions of carbon dioxide generated. This demand applies not only to the different power plants as above but also other situations and other industries where $CO_2$ is generated in their processes or by their energy consumption, for example in the cement industry and steel industry. There are a lot of different methods and arrangements for reducing the carbon dioxide emission.

However, common for the methods is that the separation of carbon dioxide from exhaust gases generated in the different industrial plants as above are energy demanding and costly and there is a need to find more efficient ways.

In one of the methods for capturing $CO_2$, known as regenerative calcium cycle (RCC), the separation of $CO_2$ from the flue gas may take place by capturing via a combined carbonation and calcination cycle. In such methods, lime (CaO) may be used as a sorbent agent for the carbon dioxide, forming carbonate of calcium ($CaCO_3$) during the so called carbonation reaction. The formed $CaCO_3$ is subsequently regenerated by heating, whereby the so called calcination reaction produces carbon dioxide and CaO.

A method and system for a regenerative calcium cycle (RCC) is described in U.S. Pat. No. 6,737,031. More specifically, a method for capturing sulfur dioxide ($SO_2$) and carbon dioxide ($CO_2$) is described therein. For capturing of the carbon dioxide the method comprises steps wherein the carbon dioxide present in the flue gases is captured by carbonization in the hearth and then released by decarbonization and the carbon dioxide released is transferred for further treatment or storage.

Although an RCC system, e.g. as described in U.S. Pat. No. 6,737,031, can be made more energy efficient than other available systems for carbon capture and storage, it still carries a negative impact on the overall efficiency of the power plant. There is a need for improved RCC systems that further reduce the impact on the overall efficiency of the power plant.

SUMMARY

The present invention relates to improvements in integrated methods and systems for combustion and $CO_2$ capture using a regenerative calcium cycle (RCC). More particularly, the present invention is contemplated for implementation in a power plant.

According to an aspect illustrated herein, there is provided a method for combustion of a fuel and treatment of the resulting flue gas, said method comprising:

combusting a fuel with air or oxygen to produce a hot flue gas stream containing at least carbon dioxide ($CO_2$) and sulfur dioxide ($SO_2$), bringing the flue gas stream into contact with solid calcium oxide (CaO) in a carbonation reactor (120) operating at a temperature at which $CO_2$ in the flue gas reacts with CaO to form solid calcium carbonate ($CaCO_3$), heating $CaCO_3$ formed in the carbonation reactor in a calcination reactor (130) operating at a temperature at which $CaCO_3$ is converted to CaO and $CO_2$, whereby said heating is at least partially effected by indirect heat exchange with the hot flue gas stream from the combustion, and recirculating CaO formed in the calcination reactor back to the carbonation reactor, characterized in that the flue gas used for indirect heat exchange in the calcination reactor is subsequently subjected to dry desulfurization before it is brought into contact with CaO in the carbonation reactor.

Desulfurization in integrated methods and systems for combustion and $CO_2$ capture using a regenerative calcium cycle (RCC) has previously been performed by CaO adsorption of $SO_2$ in the carbonation reactor concurrently with the CaO adsorption of $CO_2$. Although such coadsorption of $SO_2$ and $CO_2$ provides efficient removal of $SO_2$ from the flue gas, there are also some drawbacks. $SO_2$ reacts with CaO to form $CaSO_4$ (gypsum). $CaSO_4$ is heat stable and does not decompose along with the $CaCO_3$ in the calcination reactor. As $CaSO_4$ is accumulated in the RCC adsorbent circulation, the adsorption capacity of the system is reduced, and the recirculation rate of the RCC must be increased.

It has now been found that desulfurization of the flue gas may advantageously be performed before the flue gas is brought into contact with the CaO in the carbonation reactor. This arrangement allows a drastic reduction of the required recirculation rate in the RCC system. Desulfurization is most commonly done using, e.g., limestone in a wet scrubber process. However, it has been found that a number of beneficial synergistic effects can be achieved by performing the desulfurization process at higher temperature than those used in conventional wet scrubber processes. More specifically, it has been found that in the methods and systems of the present disclosure, desulfurization should preferably be performed at a temperature in the range of 200° C. to 700° C. This can be achieved by the use of a dry desulfurization process (also referred to herein as DFGD). The dry desulfurization process may for example comprise bringing the flue gas into contact with solid calcium oxide (CaO) at a temperature whereby $SO_2$ in the flue gas reacts with CaO to form solid calcium sulfate ($CaSO_4$) and the subsequent removal of the formed solid calcium sulfate using a suitable dedusting technique, for example using high temperature filter elements (metal or ceramic based) and/or electrostatic precipitation (ESP). Additionally, it has been found that as the CaO for the dry desulfurization process, may advantageously be employed spent CaO recovered from, for example, the flue gas filters of the system. This of course reduces the overall $CaO/CaCO_3$ consumption of the method/system as well as the total amount of waste.

According to some embodiments, the desulfurization is performed at a temperature in the range of 200° C. to 700° C.

According to some embodiments, the desulfurization is performed at a temperature in the range of 200° C. to 400° C., preferably in the range of 250° C. to 350° C.

According to some embodiments, the desulfurization is performed at a temperature in the range of 500° C. to 700° C., preferably in the range of 550° C. to 650° C.

According to some embodiments, the desulfurization comprises bringing the flue gas into contact with solid calcium oxide (CaO) at a temperature whereby $SO_2$ in the flue gas reacts with CaO to form solid calcium sulfate ($CaSO_4$).

Desulfurization may simply be performed by injection of CaO into the flue gas stream by means of a dedicated CaO injection equipment. Injection may be performed into or downstream of a combustion zone of the furnace used for heating of the calcination reactor.

According to some embodiments the CaO is injected into the combustion zone of the furnace used for heating of the calcination reactor.

According to some embodiments the CaO is injected into the flue gas stream downstream of a combustion zone of the furnace used for heating of the calcination reactor.

According to some embodiments the CaO is injected into the flue gas stream in a dedicated desulfurizer arranged downstream of a combustion zone of the furnace used for heating of the calcination reactor.

Alternatively, desulfurization may be performed by injection of the flue gas into a circulating or bubbling fluidized bed of CaO, separate from the calcination reactor.

According to some embodiments, the method further comprises the step of removing dust from the desulfurized flue gas before it is brought into contact with CaO in the carbonation reactor. This dust removal step may serve to at least partially remove solid $CaSO_4$ present in the flue gas after the dry desulfurization.

According to some embodiments, the CaO used for desulfurization of the flue gas at least partially comprises CaO recovered from the $CO_2$ rich flue gas formed in the calcination reactor, from the flue gas stream downstream of the carbonation reactor and/or from CaO formed in the calcination reactor.

According to some embodiments, the temperature in the carbonation reactor is in the range of 550 to 750° C., preferably about 650° C.

According to some embodiments, the temperature in the calcination reactor is in the range of 800 to 1100° C., preferably about 900° C.

According to another aspect illustrated herein, there is provided a system (100) for combustion of a fuel and treatment of the resulting flue gas, said system comprising:
a furnace (101)
a carbonation reactor (120)
a calcination reactor (130)
a dry desulfurizer (110)
wherein the furnace (101) is operative for combusting a fuel with air or oxygen to produce a hot flue gas stream containing at least carbon dioxide ($CO_2$) and sulfur dioxide ($SO_2$),
the carbonation reactor (120) is operative for bringing the flue gas stream into contact with solid calcium oxide (CaO) at a temperature at which $CO_2$ in the flue gas reacts with CaO to form solid calcium carbonate ($CaCO_3$),
the calcination reactor (130) is operative for heating $CaCO_3$ formed in the carbonation reactor at a temperature at which $CaCO_3$ is converted to CaO and $CO_2$,
the calcination reactor (130) comprises means for indirect heating (104) whereby said heating of $CaCO_3$ is at least partially effected by indirect heat exchange with the hot flue gas stream from the combustion, and
wherein
the dry desulfurizer (110) is operative for subjecting the flue gas stream to dry desulfurization before it is brought into contact with CaO in the carbonation reactor (120).

The system may further comprise a solids recirculation system, operative for forwarding $CaCO_3$ from the carbonation reactor to the calcination reactor and for forwarding CaO from the calcination reactor to the carbonation reactor. The system may further also comprise a fresh CaO and/or $CaCO_3$ supply system for replenishing CaO and/or $CaCO_3$ lost throughout the process.

According to some embodiments, the dry desulfurizer is configured to operate at a temperature in the range of 200° C. to 700° C.

According to some embodiments, the dry desulfurizer is operative for bringing the flue gas into contact with solid calcium oxide (CaO) at a temperature whereby $SO_2$ in the flue gas reacts with CaO to form solid calcium sulfate ($CaSO_4$).

The dry desulfurizer may comprise a dedicated CaO injection equipment operative for injection of CaO into the flue gas stream. The CaO injection equipment may be arranged in or downstream of a combustion zone of the furnace used for heating of the calcination reactor.

According to some embodiments the CaO injection equipment is arranged in the combustion zone of the furnace used for heating of the calcination reactor.

According to some embodiments the CaO injection equipment is arranged in the flue gas duct (105) downstream of a combustion zone of the furnace used for heating of the calcination reactor.

According to some embodiments the CaO injection equipment is arranged in a dedicated reactor arranged downstream of a combustion zone of the furnace used for heating of the calcination reactor.

Alternatively, the desulfurizer may comprise a dedicated circulating or bubbling fluidized bed reactor, operative for bringing the flue gas into contact with a circulating or bubbling fluidized bed of CaO at a temperature whereby $SO_2$ in the flue gas reacts with CaO to form solid calcium sulfate ($CaSO_4$).

According to some embodiments, the dry desulfurizer is in fluid connection with and configured to receive CaO recovered from a dust removal unit (132) operative for removing CaO from the $CO_2$ rich flue gas formed in the calcination reactor.

According to some embodiments, the dry desulfurizer is in fluid connection with and configured to receive CaO recovered from a dust removal unit (124) operative for removing CaO from the flue gas stream downstream of the carbonation reactor.

According to some embodiments, the dry desulfurizer is in fluid connection with and configured to receive CaO formed in the calcination reactor.

According to some embodiments, the system further comprises a dust removal unit (115) operative for removal of dust from the desulfurized flue gas before it is brought into contact with CaO in the carbonation reactor (120). This dust removal unit may serve to at least partially remove solid $CaSO_4$ present in the flue gas downstream of the dry desulfurizer.

The method or system according to any one of the aspects of the invention may be a regenerative calcium cycle (RCC) method or system or an integrated combustion and regenerative calcium cycle (RCC) method or system. By the term "integrated combustion and regenerative calcium cycle (RCC) method or system" as used herein, is meant a system for combustion of a fuel, e.g. in a power plant, wherein heat from the flue gases of the combustion is used for heating the calcination reactor.

The method or system according to any one of the aspects of the invention may be operated as a standalone integrated power generation unit, wherein the heat generated during combustion in the RCC system is used for power generation. The method or system according to any one of the aspects of the invention may also be operated as a $CO_2$ capture system for a separate power generation unit (e.g. a boiler system), wherein flue gas generated by the separate power generation unit is combined with flue gas generated during combustion in the RCC system.

According to some embodiments, the carbonation reactor and/or calcination reactor of the method or system according to any one of the aspects of the invention may comprise is/are both of the fluidized bed type. According to some embodiments, the carbonation reactor and calcination reactor are both of the circulating fluidized bed type. According to some embodiments, the carbonation reactor is of the circulating fluidized bed type and the calcination reactor is of the bubbling fluidized bed type.

The above described and other features are exemplified by the following figures and detailed description.

BRIEF DESCRIPTION OF THE DRAWINGS

Referring now to the drawings, which are exemplary embodiments, and wherein the like elements are numbered alike.

DETAILED DESCRIPTION

Figure 1:
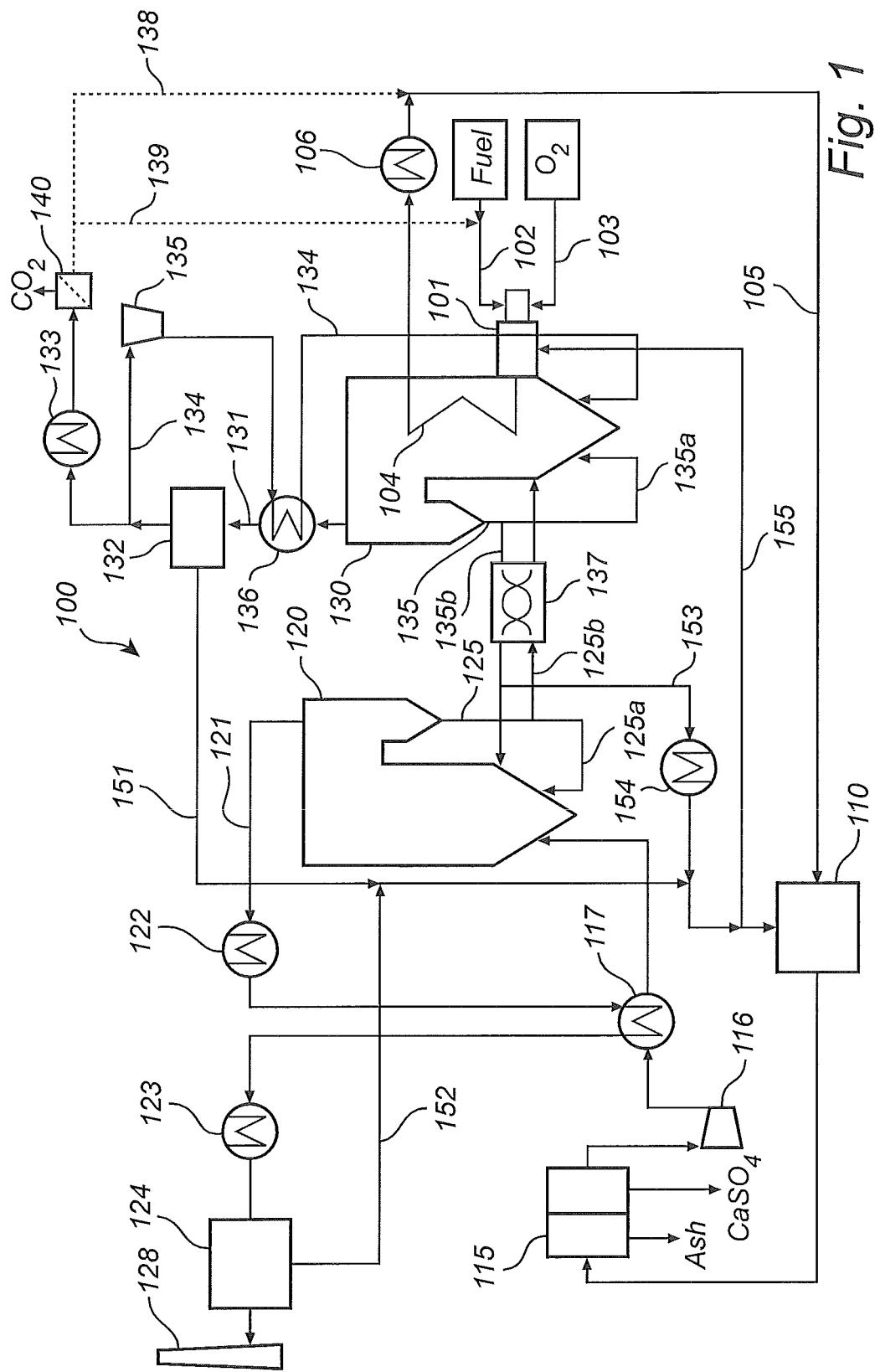
FIG. 1 schematically depicts an integrated combustion and RCC system.

An embodiment of the system of the invention is further illustrated in FIG. 1.

Herein, the system (100) is implemented in connection with a combustion process unit comprising a furnace (101) wherein carbon dioxide in the generated exhaust gas is to be captured by the RCC system. The system is heated by indirect heating of the calcination reactor (130) by the furnace (101) being fed with fuel via pipe (102) and air and/or oxygen via duct (103).

The flue gas generated by the combustion in the furnace (101) comprising, among other components, carbon dioxide and sulfur dioxide is forwarded via duct (105) to the dry flue gas desulfurizer (DFGD) (110) operative for reducing the $SO_2$ content of the flue gas. The DFGD (110) will be described more in detail below.

The flue gas with a reduced content of $SO_2$ is forwarded from the DFGD (110) to a dust removal unit (115) operative for removal of dust from the desulfurized flue gas whereby solids, e.g. solid $CaSO_4$, present in the flue gas is at least partially removed before introduction of the flue gas into the carbonation reactor (120). The dust removal unit (115) may for example comprise an electrostatic precipitation (ESP) device or any other suitable dust removal device. Besides solid $CaSO_4$, the flue gas leaving the DFGD (110) may also comprise fly ash which is also at least partially removed by the dust removal unit (115). The dust removal unit (115) may in some embodiments comprise a staged dedusting system allowing for separation of $CaSO_4$ and fly ash. This arrangement yields higher quality $CaSO_4$ and ash by-products with improved commercial viability.

Optionally, the exhaust gas may be further conditioned in a unit for conditioning the flue gas (not shown) before its introduction into the carbonation reactor (120). The optional conditioning may, for example, include treatment of the exhaust gas by removal of NOx gases (DeNOx).

The flue gas from the dust removal unit (115) (and optional further flue gas conditioning unit) is pressurized by passing the fan unit (116) and preheated by the heat exchanger (117) before introduction to the carbonation reactor (120), the reactor for capturing carbon dioxide. The carbonation reactor (120) may also be denoted "the carbonator" and the reaction "carbonation".

The exhaust gas is preferably pressurized to a pressure in the range of 50 mbarg to 400 mbarg, preferably about 100 mbarg, and heated to a temperature in the range of 300° C. to 600° C. for an optimized sorption.

The main reaction taking place in the carbonation reactor corresponds to $CaO+CO_2 \rightarrow CaCO_3$. The reaction is exothermic and takes place at temperature in the range of 550 to 750° C. The carbonation reactor is typically operating at a temperature in the range of 600° C. to 700° C., preferably at about 650° C.

The exhaust gases with a reduced content of carbon dioxide $CO_2$ forwarded from the carbonation reactor (120) via duct (121) may optionally be cooled in multiple steps, e.g. in heat exchangers (122), (117) and (123). The heat recovered in these heat exchangers may for example (as shown for heat exchanger (117) in FIG. 1) be employed for preheating of exhaust gas which will be introduced in the carbonation reactor (120) or in other heat exchangers.

Following the optional multiple step cooling, the flue gas is subjected to dust removal in a dust removal unit (124) (e.g. comprising an electrostatic precipitation (ESP) device or any other suitable dust removal device). In the dust removal unit (124) CaO and $CaCO_3$ dust carried along with the flue gas from the carbonation reactor is separated from the flue gas before the flue gas is forwarded to stack (128) for release to the atmosphere.

In the embodiment of FIG. 1 the carbonation reactor (120) and calcination reactor (130) are both of the circulating fluidized bed type. A bed of solid particles are fluidized by a gas stream passing through the bed. In the carbonation reactor (120), fluidization is effected by the gas steam forwarded from the DFGD (110) and dust removal unit (115) via fan unit (116). In the calcination reactor (130), fluidization is effected by a portion of the $CO_2$ rich flue gas stream recirculated to the calcination reactor (130) via duct (134) and preferably pressurized in a fan unit (135). Solids present in the gas stream leaving the bed are captured by a cyclone unit.

In an alternative embodiment of the system (not shown), the circulating fluidized bed calcination reactor has been replaced by a bubbling bed calcination reactor. A bubbling bed calcination reactor can be advantageous since the attrition rate of the CaO in such systems is much lower due to the lower solid velocity.

The system of the invention using the regenerative calcium cycle comprises circulation of solid material between the carbonation reactor (120) and the calcination reactor (130).

The system may further comprise a solids recirculation system, operative for forwarding $CaCO_3$ from the carbonation reactor to the calcination reactor and for forwarding CaO from the calcination reactor to the carbonation reactor.

From the carbonation reactor (120) solid material being rich in calcium carbonate $CaCO_3$, but also containing a certain amount of lime, CaO, as well as other components, is transferred to the calcination reactor (130) via pipe (125). The stream of solid material is split for different destinations of the solid material, a first part of the solid material stream in pipe (125) is recirculated back to the carbonation reactor (120) via pipe (125a). A second part of the solid material is transferred, via duct (125b), to the calcination reactor (130).

The system may further also comprise a fresh CaO and/or $CaCO_3$ supply system for replenishing CaO and/or $CaCO_3$ lost throughout the process.

In the calcination reactor (130) the calcium carbonate $CaCO_3$ is heated to effect decomposition of $CaCO_3$ into lime CaO and carbon dioxide $CO_2$. The calcination reactor (130) is also called "the calciner" and the process also called "calcination". The main reaction of the calcination reactor corresponds to $CaCO_3 \rightarrow CaO+CO_2$. The reaction is endothermic and is performed at a temperature in the range of 800° C. to 1100° C., typically at temperature about 900° C. The calcination reactor (130) is heated by indirect heating, via the furnace (101). This arrangement allows use of fuels of varying quality. Depending on the fuel quality, more or less oxygen may be supplied to the furnace. If fuel of high quality is used for heating the apparatus, the furnace may be fed with air, if lower quality the air may be mixed with oxygen, or be pure oxygen. The carbon dioxide rich flue gas generated by the furnace (101) for indirect heating of the calcination reactor may, in addition to $CO_2$, typically comprise contaminants in the form of, for example sulfur oxides SOx (e.g. $SO_2$), dust particles, hydrochloric acid, HCl, nitrous oxides NOx, and heavy metals including mercury, Hg. If the concentration of gases like oxygen ($O_2$), nitrogen ($N_2$) etc, most often introduced during the carbonation, is high a separation step may be required in the system. Otherwise, further treatment of the carbon dioxide rich flue gas may be performed in compression and/or drying systems.

The terms "indirect" or "indirectly" as used herein in connection with heat exchange between two media, such as heating, cooling or chilling, denotes that the heat exchange occurs without mixing the two medias together. By the term "indirect heat exchanger" as used herein, is meant a heat exchanger configured for indirect heat exchange. The heat exchanger may be adapted for gases (gas/gas), liquids (liquid/liquid), solids (solid/solid) or any combination thereof (e.g. gas/liquid). The heat exchanger may for example be of the shell and tube type. Suitable types and dimensions of heat exchangers are readily identified by the person skilled in the art.

In the embodiment of FIG. 1, the furnace (101) is arranged in direct connection with the calcination reactor (130) such that the hot flue gas formed during combustion in the furnace (101) is directed into a an indirect heating arrangement (104) of the calcination reactor (130). The indirect heating arrangement (104) may for example comprise heat transfer tubes arranged to transfer heat from the hot flue gas flowing through the tubes to the fluidized bed inside of the calcination reactor.

Solid material comprising mainly lime, CaO, produced by the decomposition of the calcium carbonate is transferred from the calcination reactor (130) via pipe (135) to the carbonation reactor (120). Pipe (135) is split into pipe (135a), through which first portion of the solid stream is recirculated back to the calcination reactor (130), and pipe (135b), through which a second portion of the solid stream is transferred to the carbonation reactor (120).

A heat exchanger (137) is arranged between the carbonation reactor (120) and the calcination reactor (130) and is operative for preheating the solid material transferred from the carbonation reactor via pipe (125b) using the heat of the solid material transferred from the calcination reactor via pipe (135b). The heat exchanger (137) may for example be a cross heat exchanger transferring heat from the solid material of the calcination reactor with the solid material of the carbonation reactor (solid/solid heat exchanger).

The $CO_2$ rich exhaust gas generated in the calcination (130) reactor is separated from solid material, e.g. using cyclones or other methods for separating solid material from a gas stream. The solid material is recirculated to the fluidized bed via duct (135) and (135a). The $CO_2$ enriched gas is transferred from the calcination reactor via duct (131) for further processing, e.g. including heat recovery and particulate removal.

The dust generated during the calcination process in the calcination reactor (130) may be extracted and removed from the recirculation loop for further processing in a dust removal unit (132), for example comprising an electrostatic precipitator (ESP). Further, the heat of the $CO_2$ rich gas may be recovered by a heat exchanger (133) before the gas transferred for optional further processing in a gas processing unit (GPU) (140), such as compression, storage, etc.

After the dust removal, a portion of the carbon dioxide rich exhaust gas may be recirculated to the calcination reactor (130) via duct (134). The exhaust gas is preferably pressurized in a fan (135) and preheated by the hot exhaust gas in duct (131) using a gas/gas heat exchanger (136) before being reintroduced into the calcination reactor (130), via duct (134).

Optionally, the carbon dioxide rich exhaust gas, or at least a portion thereof, may be combined, via duct (138), with gas in duct (105), recirculating the hot exhaust gas used for the indirect heating of the calcination reactor to the carbonation reactor (120).

Another option is to introduce a portion of, the carbon dioxide enriched gas, via duct 139, to the duct (102) feeding the furnace (101) with air and/or oxygen.

The hot exhaust gas comprising carbon dioxide $CO_2$ generated for the indirect heating the calcination reactor (130) is forwarded to the carbonation reactor (120), via duct (105).

Heat from the hot exhaust gas generated for the indirect heating of the calcination reactor may optionally be recovered by heat exchanger (106) (gas/gas heater).

As mentioned above, the flue gas generated by the combustion in the furnace (101) and comprising, among other components, carbon dioxide and sulfur dioxide is forwarded via duct (105) to the dry flue gas desulfurizer (110) (DFGD) operative for reducing the $SO_2$ content of the flue gas. The dry flue gas desulfurizer may simply comprise a dedicated CaO injection equipment operative for injection of CaO into the flue gas stream. The CaO injection equipment may be arranged in or downstream of a combustion zone of the furnace (101) used for heating of the calcination reactor (130). According to some embodiments the CaO injection equipment is arranged in the combustion zone of the furnace (101). According to some embodiments the CaO injection equipment is arranged in the flue gas duct (105) downstream of a combustion zone of the furnace (101). According to some embodiments the CaO injection equipment is arranged in a dedicated reactor arranged downstream of a combustion zone of the furnace used for heating of the calcination reactor. In the embodiment of FIG. 1, the CaO injection equipment is arranged in a dedicated reactor, DFGD (110), arranged downstream of a combustion zone of the furnace (101).

Alternatively, the desulfurizer may comprise a dedicated circulating or bubbling fluidized bed reactor, operative for bringing the flue gas into contact with a circulating or bubbling fluidized bed of CaO at a temperature whereby $SO_2$ in the flue gas reacts with CaO to form solid calcium sulfate ($CaSO_4$).

In the DFGD (110), the flue gas is contacted with solid calcium oxide (CaO) at a temperature in the range of in the range of 200° C. to 700° C. At these temperatures, CaO reacts with $SO_2$ present in the flue gas to form solid calcium sulfate (CaSO$_4$). In some embodiments, the desulfurization is performed at a temperature in the range of 200° C. to 400° C., preferably in the range of 250° C. to 350° C. In other embodiments, the desulfurization is performed at a temperature in the range of 500° C. to 700° C., preferably in the range of 550° C. to 650° C.

The solid calcium oxide (CaO) used for the desulfurization of the flue gas in the DFGD (110) at least partially comprises CaO recovered from the CO$_2$ rich flue gas formed in the calcination reactor (130), from the flue gas stream downstream of the carbonation reactor (120) and/or from CaO formed in the calcination reactor, e.g. from the carbonation reactor CaO feed stream. The CaO used in the DFGD (110) may for example comprise CaO collected from the dust removal unit (132) operative for removing dust from the CO$_2$ rich flue gas stream leaving the calcination reactor (130), forwarded to the DFGD via duct (151). The CaO used in the DFGD (110) may also comprise CaO collected from the dust removal unit (124) operative for removing dust from the flue gas stream leaving the carbonation reactor (120), forwarded to the DFGD via duct (152). The CaO used in the DFGD may also comprise CaO drawn off from the carbonation reactor CaO feed stream (135b), forwarded to the DFGD via duct (153), optionally with cooling of the CaO in heat exchanger (154). In an alternative embodiment, the CaO, or at least a portion thereof, is directed to the furnace (101), via the duct (155).

Figure 2:
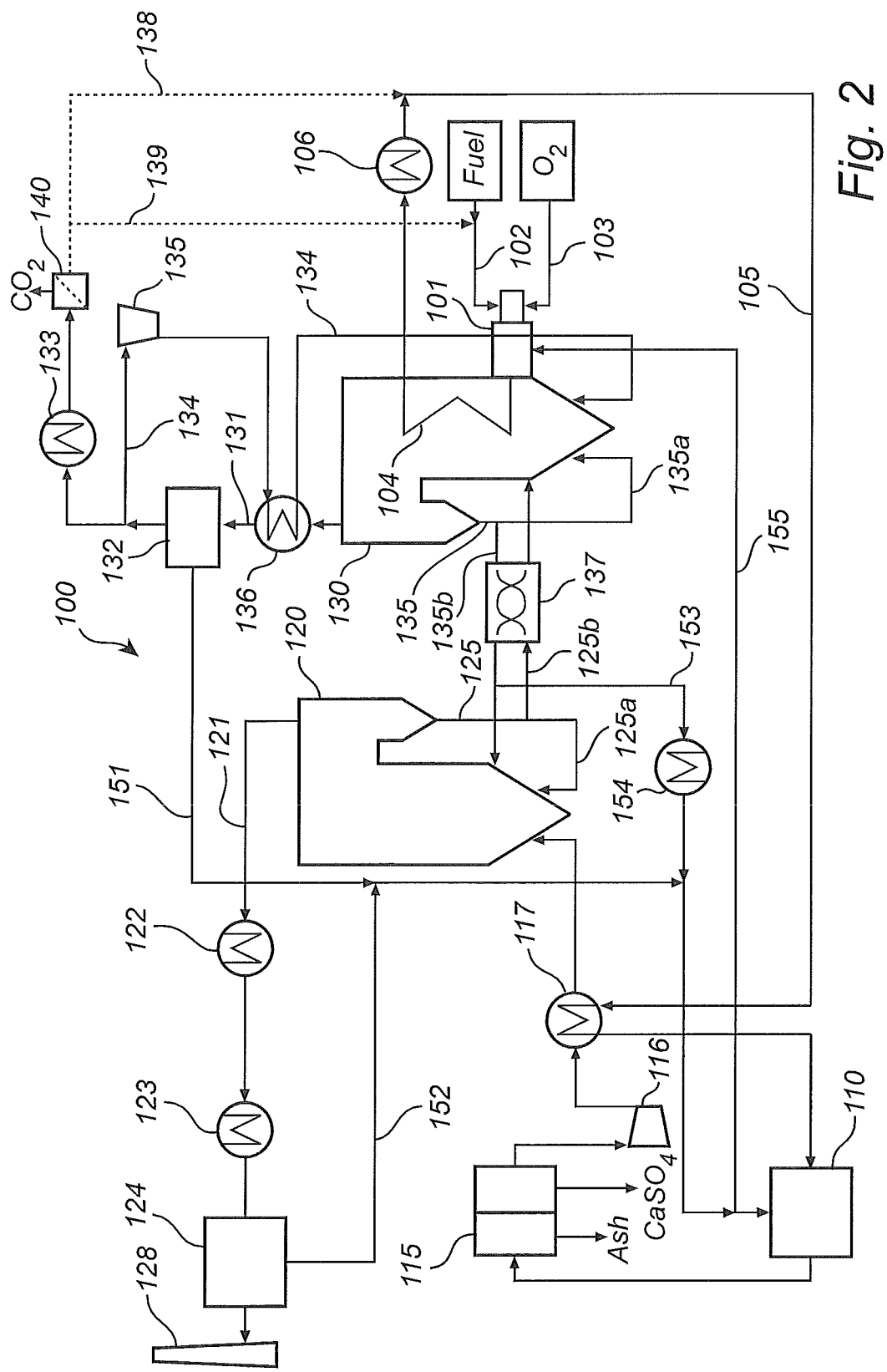
FIG. 2 schematically depicts an integrated combustion and RCC system with dry flue gas desulfurization.

An embodiment of the system of the invention is further illustrated in FIG. 2. The embodiment of FIG. 2 is mainly identical to the embodiment of FIG. 1 with the exception that in FIG. 2, the flue gas forwarded via duct (105) to the dry flue gas desulfurizer (DFGD) (110) is subjected to heat exchange in heat exchanger (117) with the pressurized flue gas being forwarded from the fan unit (116) towards the carbonation reactor (120). This configuration may further decrease the overall impact of the RCC CO$_2$ capture system on the overall efficiency of the power plant.

As used herein, the term "desulfurization" refers to a process for the (at least partial) removal of sulfur dioxide, SO$_2$, from a flue gas stream. A "desulfurizer" refers to an apparatus dedicated for the removal of SO$_2$ from a flue gas stream.

Advantages Obtained by the Present Invention Include

The present invention reduces the impact of the RCC CO$_2$ capture system on the overall efficiency of the power plant.

The present invention prevents accumulation of CaSO$_4$ in the RCC adsorbent circulation which may otherwise cause the adsorption capacity of the system to become reduced.

The inventive arrangement allows a drastic reduction of the required recirculation rate in the RCC system.

Desulfurization at a temperature in the range of 200° C. to 700° C. reduces the need for cooling and reheating of the flue gas for desulfurization.

The invention provides for using spent CaO recovered from, for example, the flue gas filters of the system for desulfurization. This reduces the overall CaO/CaCO$_3$ consumption of the method/system as well as the total amount of waste.

The quality of fuel for heating the system may vary widely as the heating is performed indirectly into the calcination reactor, the calciner.

The CO$_2$ product captured is of high purity as no direct entrainment of impurities into the CO$_2$ product occur. Impurities and contaminants are mainly adsorbed by the CaO.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for combustion of a fuel and treatment of the resulting flue gas, said method comprising:
   combusting a fuel with air or oxygen to produce a hot flue gas stream containing at least carbon dioxide (CO$_2$) and sulfur dioxide (SO$_2$),
   bringing the flue gas stream into contact with solid calcium oxide (CaO) in a carbonation reactor operating at a temperature at which CO$_2$ in the flue gas reacts with CaO to form solid calcium carbonate (CaCO$_3$),
   heating CaCO$_3$ formed in the carbonation reactor in a calcination reactor operating at a temperature at which CaCO$_3$ is converted to CaO and CO$_2$, whereby said heating is at least partially effected by indirect heat exchange with the hot flue gas stream from the combustion, and
   recirculating CaO formed in the calcination reactor back to the carbonation reactor,
   wherein the flue gas used for indirect heat exchange in the calcination reactor is subsequently subjected to dry desulfurization before it is brought into contact with CaO in the carbonation reactor.

2. The method according to claim 1, wherein the desulfurization is performed at a temperature in the range of 200° C. to 700° C.

3. The method according to claim 2, wherein the desulfurization is performed at a temperature in the range of 200° C. to 400° C.

4. The method according to claim 2, wherein the desulfurization is performed at a temperature in the range of 500° C. to 700° C.

5. The method according to claim 1, wherein the desulfurization comprises bringing the flue gas into contact with solid calcium oxide (CaO) at a temperature whereby SO$_2$ in the flue gas reacts with CaO to form solid calcium sulfate (CaSO$_4$).

6. The method according to claim 1, further comprising the step of removing dust from the desulfurized flue gas before it is brought into contact with CaO in the carbonation reactor.

7. The method according to claim 5, wherein the CaO used for desulfurization of the flue gas at least partially comprises CaO recovered from the CO$_2$ rich flue gas formed in the calcination reactor, from the flue gas stream downstream of the carbonation reactor and/or from CaO formed in the calcination reactor.

8. The method according to claim 1, wherein the temperature in the carbonation reactor is in the range of 550° C. to 750° C.

9. The method according to claim 1, wherein the temperature in the calcination reactor is in the range of 800° C. to 1100° C.

10. A system for combustion of a fuel and treatment of the resulting flue gas, said system comprising:
    a furnace
    a carbonation reactor a calcination reactor a dry desulfurizer wherein the furnace is operative for combusting a fuel with air or oxygen to produce a hot flue gas stream containing at least carbon dioxide ($CO_2$) and sulfur dioxide ($SO_2$), the carbonation reactor is operative for bringing the flue gas stream into contact with solid calcium oxide (CaO) at a temperature at which $CO_2$ in the flue gas reacts with CaO to form solid calcium carbonate ($CaCO_3$), the calcination reactor is operative for heating $CaCO_3$ formed in the carbonation reactor at a temperature at which $CaCO_3$ is converted to CaO and $CO_2$, the calcination reactor comprises means for indirect heating whereby said heating of $CaCO_3$ is at least partially effected by indirect heat exchange with the hot flue gas stream from the combustion, and wherein the dry desulfurizer is operative for subjecting the flue gas stream to dry desulfurization before it is brought into contact with CaO in the carbonation reactor.

11. The system according to claim 10, wherein the dry desulfurizer is configured to operate at a temperature in the range of 200° C. to 700° C.

12. The system according to claim 10, wherein the dry desulfurizer is operative for bringing the flue gas into contact with solid calcium oxide (CaO) at a temperature whereby $SO_2$ in the flue gas reacts with CaO to form solid calcium sulfate ($CaSO_4$).

13. The system according to claim 10, wherein the dry desulfurizer is in fluid connection with and configured to receive CaO recovered from a dust removal unit operative for removing CaO from the $CO_2$ rich flue gas formed in the calcination reactor.

14. The system according to claim 10, wherein the dry desulfurizer is in fluid connection with and configured to receive CaO recovered from a dust removal unit operative for removing CaO from the flue gas stream downstream of the carbonation reactor.

15. The system according to claim 10, wherein the dry desulfurizer is in fluid connection with and configured to receive CaO formed in the calcination reactor.

16. The system according to claim 10, further comprising a dust removal unit operative for removal of dust from the desulfurized flue gas before it is brought into contact with CaO in the carbonation reactor.

17. The method according to claim 2, wherein the desulfurization is performed at a temperature in the range of 250° C. to 350° C.

18. The method according to claim 2, wherein the desulfurization is performed at a temperature in the range of 550° C. to 650° C.

19. The method according to claim 1, wherein the temperature in the carbonation reactor is about 650° C.

20. The method according to claim 1, wherein the temperature in the calcination reactor is about 900° C.

* * * * *